United States Patent [19]

Géniéis

[11] Patent Number: 5,059,020
[45] Date of Patent: Oct. 22, 1991

[54] DEVICES FOR AUTOMATICALLY FEEDING AN IMAGE PROJECTOR

[76] Inventor: Jean A. Géniéis, Quartier St Clair - Lieu dit Peigros, 83640 St Zacharie, France

[21] Appl. No.: 625,312

[22] Filed: Dec. 10, 1990

[30] Foreign Application Priority Data

Dec. 22, 1989 [FR] France .............................. 89 17400

[51] Int. Cl.[5] .............................................. G03B 23/02
[52] U.S. Cl. .............................. 353/122; 353/DIG. 5; 353/DIG. 3; 353/103
[58] Field of Search .......... 353/122, DIG. 3, DIG. 5, 353/26 A, 26 R, 25, 103, 104, 114, 113, 27 A, 27 R

[56] References Cited

U.S. PATENT DOCUMENTS

| | | | |
|---|---|---|---|
| 3,574,454 | 4/1971 | Deeg | 353/114 |
| 4,264,158 | 4/1981 | Lindquist | 353/DIG. 5 |
| 4,707,092 | 11/1987 | Mindell | 353/DIG. 5 |
| 4,756,616 | 7/1988 | Min et al. | 353/DIG. 5 |

FOREIGN PATENT DOCUMENTS

| | | |
|---|---|---|
| 254317 | 1/1988 | European Pat. Off. . |
| 2418945 | 9/1979 | France . |
| 0188624 | 10/1984 | Japan .......................... 353/DIG. 5 |

Primary Examiner—Allan N. Shoap
Assistant Examiner—William C. Dowling
Attorney, Agent, or Firm—Dvorak and Traub

[57] ABSTRACT

A device of the invention is associated with a projector including a horizontal platform on which document sheets are placed one after the other in order to project images thereof on a screen. The device includes two removable cassettes each fitted with levers carried by respective shafts actuated by respective electromagnets. Above the leading edge of each cassette there are two transverse shafts carrying return pulleys over which belts pass for driving the top document from a stack of documents in the cassette. The device includes a horizontal plate which is positioned in alignment with the platform of the projector. An application lies in projecting images during a lecture.

10 Claims, 7 Drawing Sheets

DEVICES FOR AUTOMATICALLY FEEDING AN IMAGE PROJECTOR

FIELD OF THE INVENTION

The present invention relates to devices for automatically feeding an image projector. The technical field of the invention is constructing accessories for image projectors.

BACKGROUND OF THE INVENTION

Portable projections known as "overhead" projectors are known which comprise a housing that is placed on a table and which includes a horizontal and transparent platform on which generally transparent sheets having drawings or other information marked thereon are placed one after the other, and the apparatus projects an enlarged image of each sheet on a screen. Such projectors are commonly used by lecturers in order to project documents while they are lecturing The usual process consists in the lecturer or an operator manually placing the documents to be projected one after another on the platform of the projector Each transparent document is stored in a projection sleeve, and the documents are stored in a determined order in a file.

Document handling takes time, deteriorates the state of the transparent documents, and contributes to unclear images being projected because of fingermarks.

With this manual process, the lecturer must retrieve the document to be projected from its protective sleeve and put away the preceding document.

If the lecturer desires to project a previously-projected document a second time, then the lecturer needs time to find that document.

French patent application FR-A-2 557 986 (Eric Lallier) describes a device for feeding a projector by means of a film
  which is wound on a reel Publication FR-A-2 418 945 (Inger Lindquist) describes a device for feeding a projector including a magazine which is displaced vertically.

An object of the present invention is to provide a device for association with an image projector, in particular with a portable overhead projector, that merely requires a button to be pressed to cause a document sheet to be taken from a cassette and placed automatically on the platform of the projector, and then returned automatically to the cassette when another button is pressed, without the document sheet being touched by anybody.

SUMMARY OF THE INVENTION

The present invention provides a device for automatically feeding an image projector including a horizontal platform on which document sheets to be projected are to be placed one after another, the device comprising:

a top cassette and a bottom cassette which are superposed and parallel, each cassette being capable of containing a stack of sheets, each cassette being fitted with electrically controlled means for lifting the stack of sheets contained in the cassette;

forwards and reverse motorized means situated above the front end of each cassette for driving a sheet out from said cassette and for returning a sheet into said cassette;

a fixed horizontal plate which is positioned in line with said platform of the projector and which is fitted with bothway motorized drive means situated above said fixed horizontal plate and extending over said platform; and a motor-driven switching plate whose rear edge is fixed on a transverse hinge shaft situated slightly in front of the leading edge of the top cassette, which switching plate normally occupies a first position where its leading edge is situated slightly above said fixed horizontal plate so that a sheet coming from said fixed horizontal plate passes beneath the switching plate and goes towards the bottom cassette, and is capable of occupying a second position where its leading edge penetrates into openings in said fixed horizontal plate such that a sheet coming from said fixed horizontal plate moves onto said switching plate and goes towards the top cassette.

Advantageously, said cassettes are removable and are engaged on slideways fixed to two side plates of a frame of the device.

In a preferred embodiment, the bottom of each cassette includes openings situated in the vicinity of its leading edge, and each cassette is fitted with levers situated beneath said openings and mounted on a transverse shaft which is actuated by an electromagnet.

In a preferred embodiment, the device of the invention includes two transverse shafts overlying the leading ends of respective ones of the cassettes, which shafts carry deflector pulleys having endless belts passing thereover for driving said sheets, with one of the two shafts being rotatable in both directions by an electric motor.

The invention provides novel devices which are associated with image projectors and which enable the projectors to be fed automatically with document sheets, images of which are to be projected on a screen.

Devices of the invention facilitate the work of users of any type of projector that includes a horizontal platform. They provide an automatic process for changing documents. They enable each document to be positioned in two different positions. When operating forwards, they enable a document to be extracted from one or other of the two cassettes and to be transported and positioned automatically on the platform of the projector.

When operating backwards, they enable the documents placed on the platform of the projector to be withdrawn, to be conveyed automatically to one or other of the two cassettes, and to be put away therein.

During a lecture, a lecturer can thus cause the same document to be replaced on the projector.

Advantageously, the buttons controlling the beginning of each operating cycle are placed on an infrared or ultrasonic remote control device, thereby giving the lecturer considerable freedom of movement.

After being removed from the apparatus, the removable cassettes may be inserted into a case for transporting or storing the documents.

A device of the invention avoids the use of masks or transparent documents which are superposed to show successive stages of a process It suffices to prepare a series of documents, each having a complete drawing thereon for the corresponding step.

BRIEF DESCRIPTION OF THE DRAWINGS

An embodiment of the invention is described by way of example with reference to the accompanying drawings, in which.

DETAILED DESCRIPTION

Figure 1:
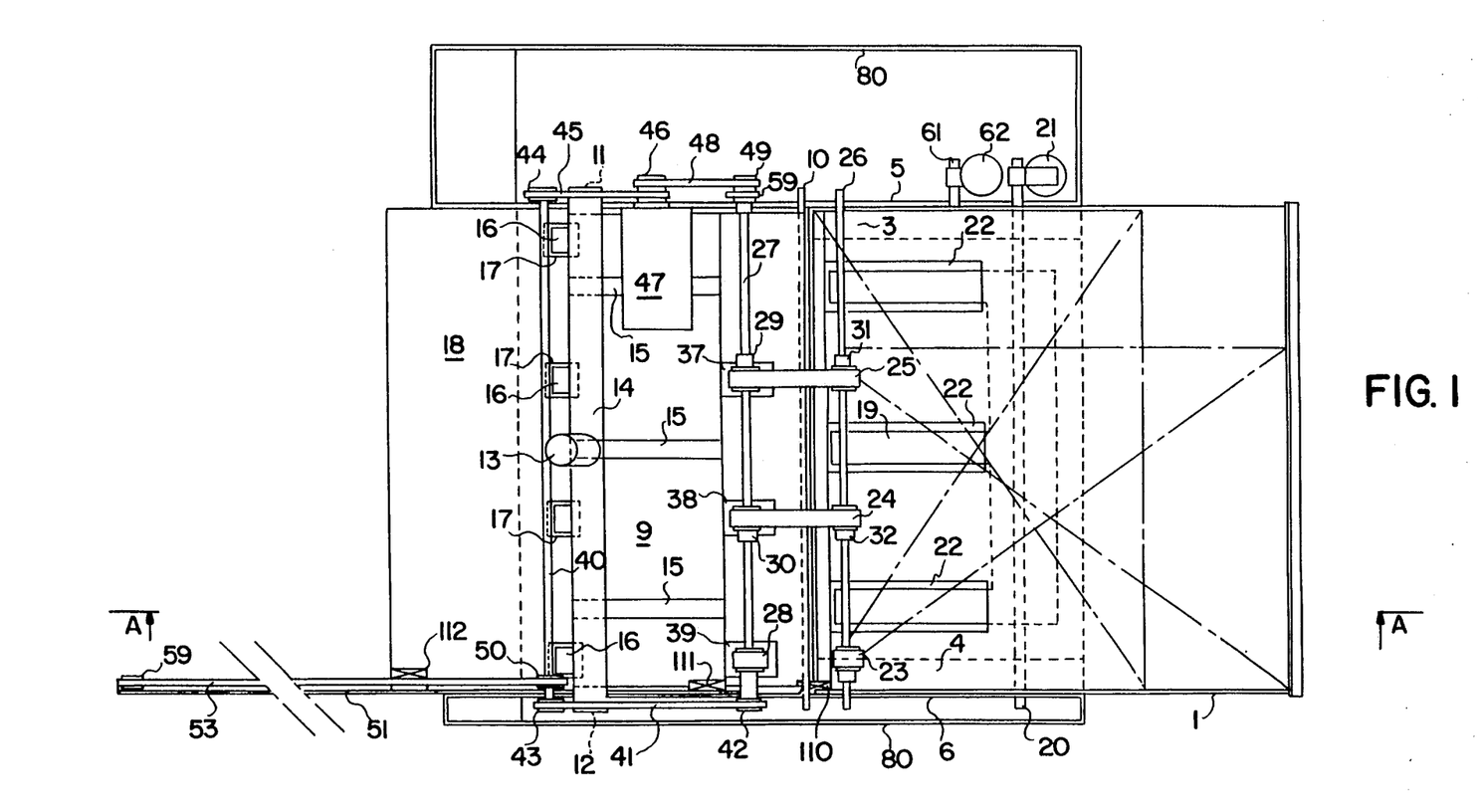
FIG. 1 is a plan view of a device of the invention without a projector.
Figure 2:
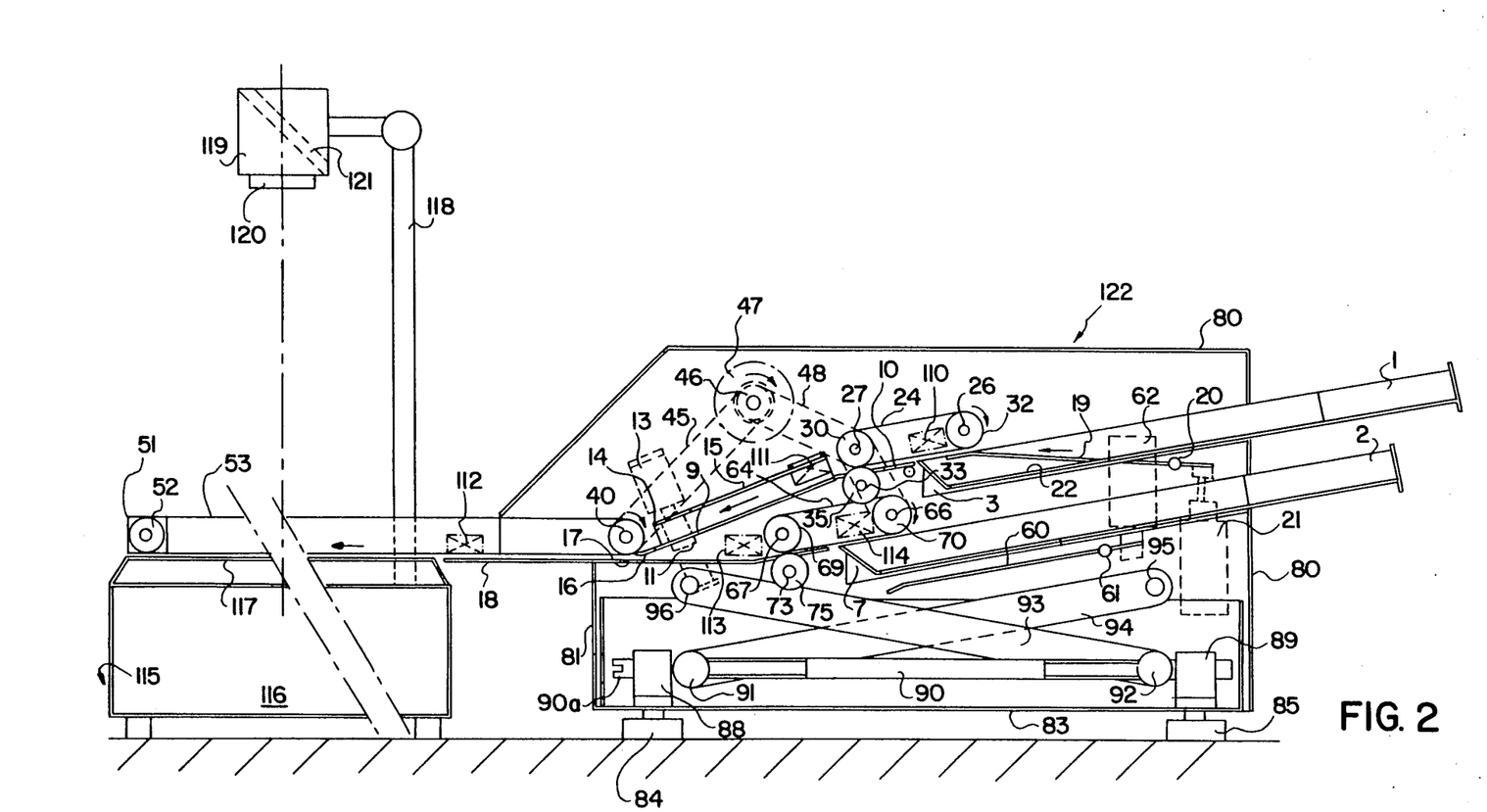
FIG. 2 is a vertical section on AA of FIG. 1 and also showing a projector, this figure representing the stage during which a sheet is being extracted from the top cassette.

FIGS. 1 and 2 show a device which is associated with an image projector 115, e.g. a portable overhead projector enabling a lecturer to project images of documents on a screen, which documents may be constituted by text or by drawings marked on generally transparent sheets.

The overhead projector 115 comprises a portable housing 116 which is stood on a table or on any other support. The housing contains, for example, a light source and a Fresnel lens. The top face of the housing constitutes a transparent platform 117 on which the document sheets are placed one after another, with the Fresnel lens concentrating light thereon.

The housing 116 is fitted with an upstanding post 118 which supports a small housing 119 containing an objective lens 120 which forms an image of the document placed on the platform, and a mirror 121 which deflects light rays towards a screen.

The device 122 of the invention is intended to be associated with a projector 115 to feed it automatically with document sheets.

A device of the invention includes two identical cassettes which are superposed and parallel, namely a top cassette 1 and a bottom cassette 2. These cassettes are constituted by square or rectangular trays which are open on top and each of which is capable of receiving a stack of document sheets.

The cassettes are inserted on pairs of slideways, e.g. for the cassette 1, slideways 3 and 4 fixed respectively to two side walls 5 and 6.

Figure 3:
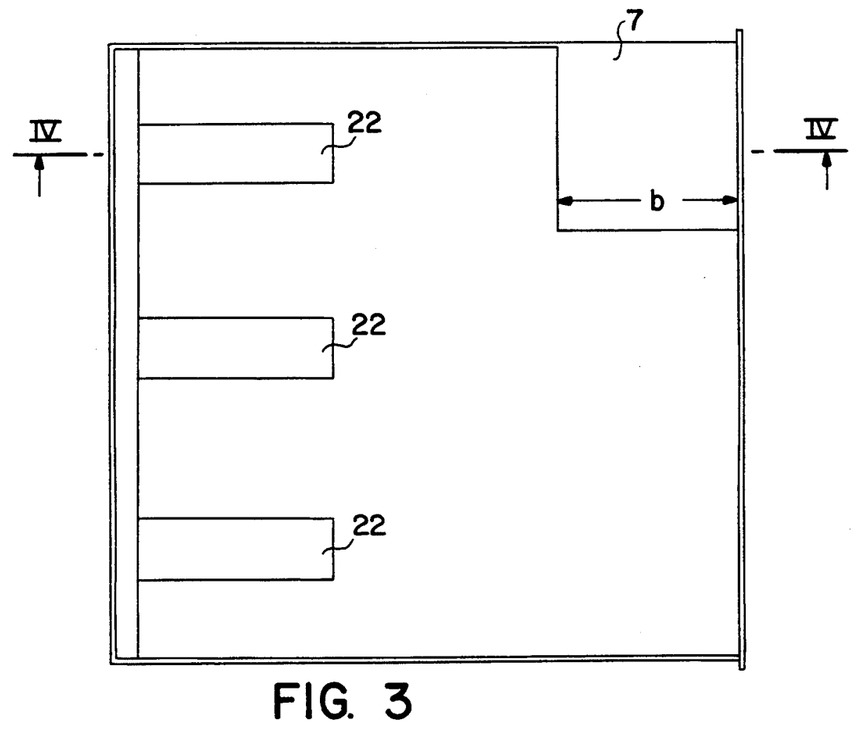
FIG. 3 is a plan view of a cassette.
Figure 4:
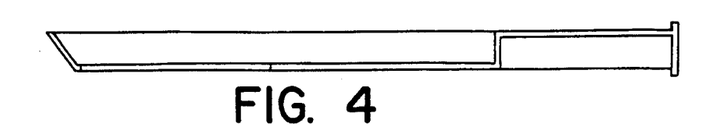
FIG. 4 is a vertical section on IV—IV of FIG. 3.

FIG. 3 is a plan view of a preferred embodiment of a cassette, and FIG. 4 is a section on IV—IV of FIG. 3. In these figures, it can be seen that the bottom of each cassette includes a plurality of openings, e.g. three rectangular openings 22 which are situated close to the leading edge of the cassette.

These openings allow document-raising fingers to pass therethrough, as explained below. The leading edge of each cassette slopes slightly upwards and forwards in order to facilitate extracting sheets from the cassette.

FIG. 3 shows a square cassette of side slightly longer than the longer side of the document sheets.

In one of the corners along its rear edge, the bottom of the cassette includes a raised square portion 7 with the top thereof being level with the top edges of the cassette.

This raised portion is of side b, where b is equal to the difference between the longer side and the shorter side of the document sheets, thereby enabling the documents to be placed in a single stack which is contained in the cassette with the longer side of the documents extending either lengthwise or crosswise.

A device of the invention includes document switching means disposed in front of the front edge of the top cassette, i.e. on the side thereof facing the projector.

In a preferred embodiment, this switching means is constituted by a pivoting plate 9.

The rear edge of this plate is parallel to the front edge of the top cassette and is situated a little way in front of it and at the same level. This rear edge is mounted on a transverse shaft 10 so that when the plate pivots about this shaft, its rear edge remains substantially in the same place.

The plate 9 is folded. It comprises a rear portion substantially parallel to the bottoms of the cassettes and a front portion which slopes downwards.

The hinge shaft 10 is supported by the two side plates 5 and 6. Two springs 11 and 12 situated on either side of the front edge of the plate 9 urge it upwards.

When excited, an electromagnet 13 mounted on a cross-bar 14 urges the plate 9 downwards. The effect of the electromagnet opposes the effect of the spring 11. Along its front edge, the plate 9 includes notches which delimit crenellations 16 between the notches. A plurality of brushes 15, e.g. three brushes, are disposed above the plate 9 and parallel thereto.

The bristles of these brushes keep document sheets pressed against the plate 9.

A device of the invention includes a fixed plate 18 having a horizontal front portion which is placed in alignment with the platform 117 of the overhead projector.

This horizontal plate portion includes openings 17 situated beneath the crenellations 16 of the pivoting plate g.

When the electromagnet 13 is excited, the front end of the plate 9 tilts downwards and its crenellations 16 engage in the openings 17 such that a sheet coming from the platform 17 follows the plate 9 and is directed to the top cassette. When the electromagnet 13 is no longer excited, the spring 11 urges the plate 9 upwards, such that the front end of the plate 9 lies above the fixed plate 18 and is separated therefrom by an empty space so that a sheet coming from the platform 117 passes underneath the plate 9 and is directed to the bottom cassette Each of the top and bottom cassettes is fitted with electrically-controlled drive means enabling a stack of sheets situated in the cassette to be lifted.

In a preferred embodiment, the top cassette is fitted with an arm fixed to a transverse shaft 20, which arm carries three levers 19 disposed beneath respective ones of the three openings 22 in the bottom of the cassette. The shaft 20 is actuated by an electromagnet 21 which acts on a lever fixed to the shaft.

When the electromagnet 21 is excited, the three levers 19 pass through the three openings 22 and lift the pile of sheets placed in the cassette.

Similarly, the bottom cassette is fitted with a transverse shaft 61 carrying three levers 60 which penetrate into openings cut out in the bottom of the cassette 2 The shaft 61 is actuated by an electromagnet 62.

A transverse shaft 26 mounted in bearings carried by the side plates 5 and 6 overlies the front end of the bottom cassette.

The shaft 26 carries a wheel 23 and two deflector pulleys 31 and 32 over which endless belts 24 and 25 are disposed.

A second transverse shaft 27 is placed in front of the shaft 26. The shaft 27 carries a wheel 28 and two deflector pulleys 29 and 30 over which the belts 24 and 25 pass respectively.

The wheel 28 and the deflector pulleys 29 and 30 are respectively disposed over three openings 37, 38, and 39 cut out in the pivoting plate 9.

Another transverse shaft 33 is placed beneath the shaft 27, and this shaft 33 carries three presser wheels which bear respectively against the wheel 28, and against the two belts 24 and 25 via the openings 37, 38, and 39. Only one of these wheels 35 is visible in FIG. 3.

The shaft 27 is a drive shaft which is driven to rotate in both directions by an electric motor 27 via a transmission including two deflector pulleys 46 and 49, and an endless belt 48.

The device includes a fourth transverse shaft 40 which is disposed above the fixed plate 18.

The shaft 40 carries a deflector pulley 50 in the vicinity of one of its ends with an endless belt 53 passing thereover, which endless belt passes over a second pulley 52 carried by a support 51 which is fixed to one of the side plates 6. The bottom length of the belt 53 slides over the horizontal portion of the fixed plate 18 and over the platform 117, such that the pulley 53 serves to drive a sheet placed on these horizontal surfaces in one direction or the other.

FIG. 1 shows an embodiment including a single belt 53 which is situated in line with the side plate 6 disposed furthest from the raised floor portions 7 of the cassettes, thereby ensuring that the belt 53 drives documents in both of the two possible positions.

In a variant, the device could have two belts situated in line with respective ones of the side plates 5 and 6.

The shaft 40 is connected to the drive shaft 27 by a cog belt 41 passing over two deflector pulleys 42 and 43 mounted respectively on the shaft 40 and on the shaft 27.

The shaft 40 is driven by a transmission including a pulley 44 mounted on the shaft 40, a pair of pulleys 46 mounted on the drive shaft of the motor, and a cog belt 45.

In order to ensure good contact between the belt 53 and the platform 117 of the overhead projector, a brush may be mounted on the support 51 so that the bristles of the brush bear against the bottom length of the belt 53.

The bottom cassette 2 is fitted with a document transporter device identical to that fitted to the top cassette.

This device comprises a first driven shaft 66 carrying return pulleys 70 over which belts 64 pass, which belts also pass over pulleys 69 carried by a second transverse shaft 67 with a third transverse shaft 73 overlying them, the third shaft 73 carrying wheels 75 lying in openings 78 situated in line with the fixed plate 18 which is parallel to the bottom cassette.

A device of the invention includes a plurality of sensors for detecting the presence of a document sheet. It includes a first sensor 110 disposed above the leading end of the top cassette, a second sensor 111 disposed above the pivoting plate 9, a third sensor 112 disposed above the leading end of the fixed plate 118, a fourth sensor 113 disposed above the rear end of the fixed plate 18, and a fifth sensor 114 disposed above the leading end of the bottom cassette.

These sensors may be photoelectric cells, for example, or electrical microswitches, or capacitive sensors.

The assembly constituted by the side plates 5 and 6, the transverse shafts, the plates 9 and 18, and the cassettes constitutes a top stage carried by the side plates 5 and 6 and interconnected by two transverse plates 80 and 81.

This top stage is supported by two transverse rods 95 and 96 capable of being raised by a "scissors" device constituted by two crossed links 93 and 94 which are hinged on two moving nuts 91 and 92 mounted on a tumbuckle rod 90 having two oppositely-handed threads.

The rod 90 is mounted on two bearings 88 and 89 which constitute a portion of a bottom stage 82, 83 standing on two feet 84 and 85.

One end of the rod 90 includes a slot 90a to enable the rod to be rotated using a screwdriver, thereby making it possible to adjust the height of the top stage so as to move the horizontal plate 18 into the plane of the platform 117 of the overhead projector.

The device of the invention is fitted with a set of relays or with an electronic central control unit serving to provide automatic control of the succession of operations required for taking a document sheet from the cassette 1 or from the cassette 2 and moving it to the overhead projector, or vice versa.

The device includes a keypad having two dispensing control buttons, with the lecturer pressing against one or other button in order to cause a sheet to be taken from a respective one of cassette 1 and cassette 2, and two return control buttons which cause a document to be returned respectively to cassette 1 or to cassette 2. Advantageously, the keypad constitutes a portion of a portable remote control device operating by means of infrared radiation or ultrasound.

Figure 7:
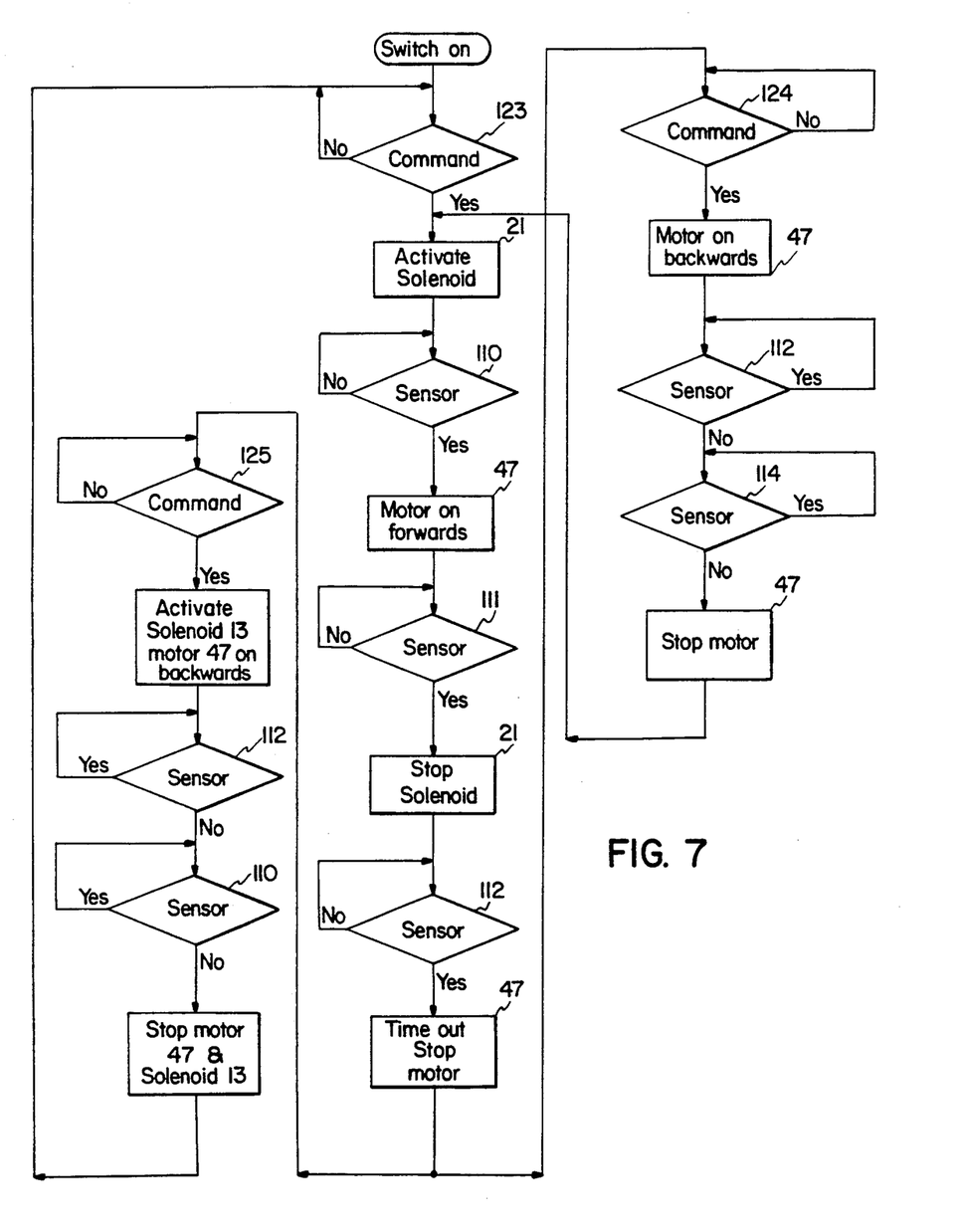
FIG. 7 is a flow chart of the operations for extracting a document from the top cassette and for returning it to the top cassette or to the bottom cassette.

FIG. 7 is a flow chart showing the sequence of operations for taking a sheet from cassette 1 and for returning it either to cassette 1 or to cassette 2. The operator begins by pressing the ON button, thereby turning on the apparatus. The operator then presses a button 123 to extract the sheet that is at the top of the stack in cassette 1. Pressing the button 123 initiates a sequence of operations which will automatically cause said sheet to be moved onto the platform 117 of the overhead projector.

The solenoid of electromagnet 21 is excited, thereby raising the levers 19 which lift the stack of documents. When sensor 110 detects the presence of a sheet, it switches on the motor 47 in a forwards direction. Regardless of its position in the cassette, the top sheet is driven forwards by the belts 24 and 25 and it engages between the belts and the wheels 35.

As soon as the sensor 111 detects the trailing edge of the sheet, it switches off power to the solenoid 21.

The levers 19 and the stack of documents move back down inside the cassette 1 so that only one document is taken. When the sensor 112 detects the passage of a sheet, it automatically causes the motor 47 to be switched off after a small time delay has elapsed to enable the document to reach the platform 117. The document is then projected onto the screen. The path of the document is shown in FIG. 2 by arrows.

When the operator decides that this document has been projected for long enough, pressure on button 124 will cause the document to return to cassette 2, whereas pressure on button 125 will cause the document to return to cassette 1.

The righthand portion of FIG. 7 shows the sequence of operations that return the document to cassette 2. Actuating button 124 switches on the motor 47 in reverse.

When the two sensors 112 and 114 no longer detect the presence of a document they switch off the motor 47.

The lefthand portion of FIG. 7 shows the return of a document to the cassette 1. When the operator actuates button 125, the solenoid 13 is excited. The switching plate g is urged downwards and its crenellations 16 engage in the openings 17 in the plate 18.

Simultaneously, the motor 47 is switched on in reverse. The document moves back up along the plate 9 towards the cassette 1. When the sensor 112 and the sensor 110 no longer detect the presence of the document, they automatically switch off the motor 47 and switch off the feed to the solenoid 13.

Figure 6:
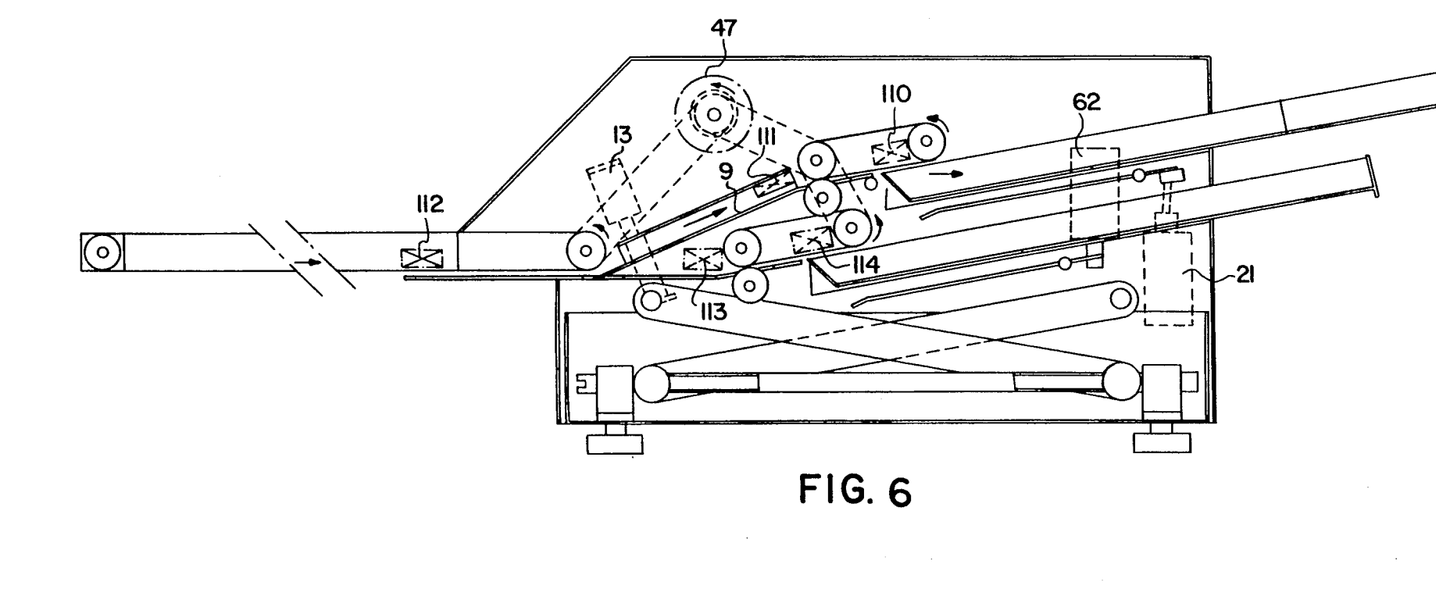
FIG. 6 is a vertical section analogous to FIG. 2 showing a document being returned to the top cassette.

FIG. 6 shows the position of the plate 9 while a document is returning to the cassette 1. The document part is represented by arrows.

Figure 8:
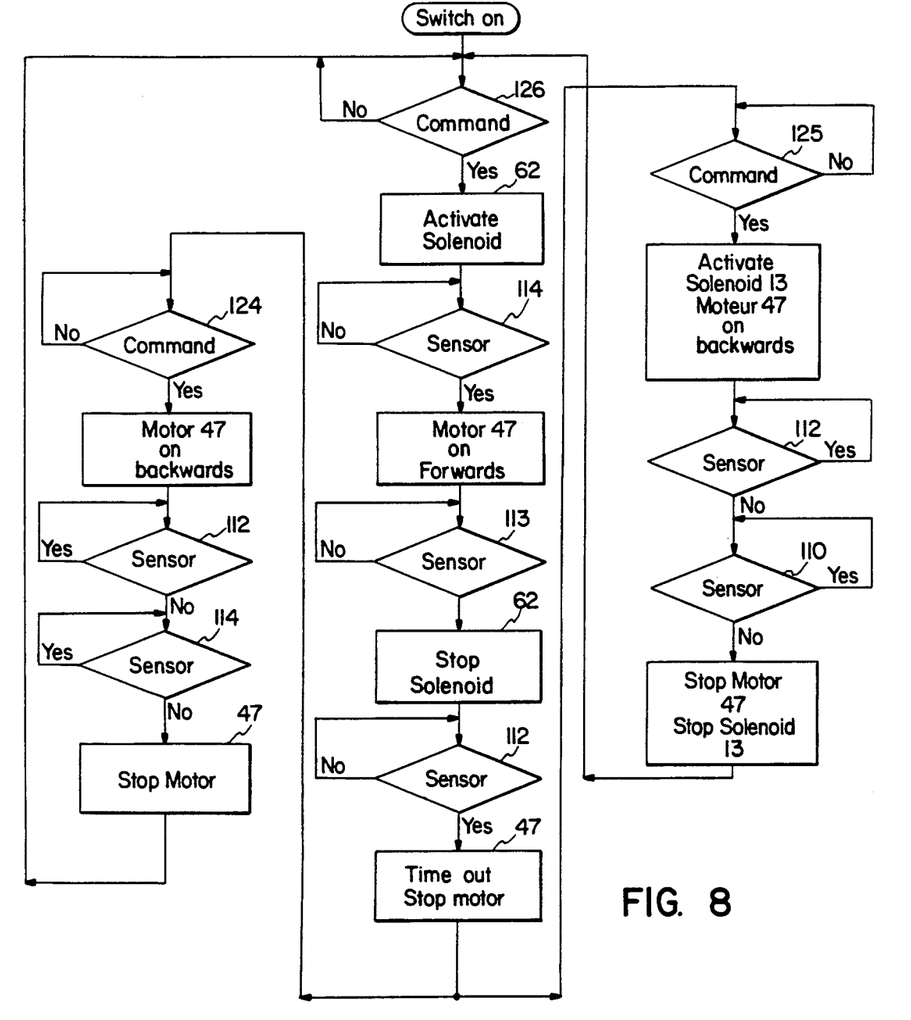
FIG. 8 is a flow chart of the operations for extracting a document from the bottom cassette and for returning it to the bottom cassette or to the top cassette.

FIG. 8 is a flow chart analogous to that of FIG. 7 and showing the operations for taking a document from cassette 2 and returning it either to cassette 1 or to cassette 2.

Figure 5:
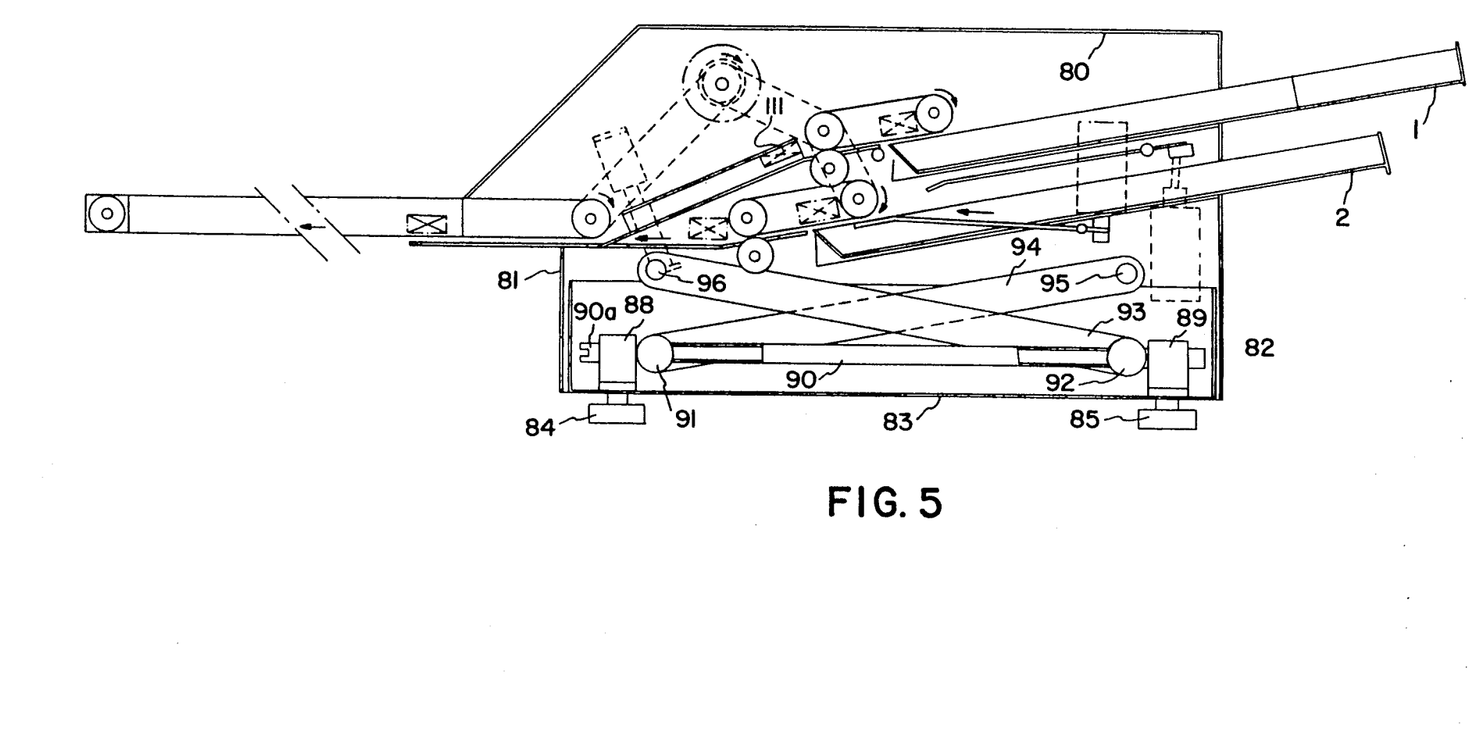
FIG. 5 is a vertical section analogous to FIG. 2 showing a document being extracted from the bottom cassette.

The operator presses a button 126 to cause the document situated at the top of the stack contained in cassette 2 to be taken. This action triggers a sequence of operations leading automatically to the document being placed on the platform 117. The path followed by the document is represented by arrows in FIG. 5.

The righthand portion of FIG. 8 represents the sequence of operations that are initiated by pressing a button 125 for returning the document to cassette 1. The lefthand portion of FIG. 8 shows the sequence of operations that are initiated by pressing the button 124 to return the document to cassette 2.

It can be seen that a device of the invention enables a lecturer to project documents one by one merely by pressing each time on a button.

Advantageously, the control buttons are placed on a portable infrared or ultrasonic remote control device, thereby giving the lecturer great freedom of movement.

I claim:

1. A device for automatically feeding an image projector including a horizontal platform on which document sheets to be projected are to be placed one after another, the device comprising:

a top cassette and a bottom cassette which are superposed and parallel, each cassette being capable of containing a stack of sheets, each cassette being fitted with electrically controlled means for lifting the stack of sheets contained in the cassette;

forwards and reverse motorized means situated above the front end of each cassette for driving a sheet out from said cassette and for returning a sheet into said cassette;

a fixed horizontal plate which is positioned in line with said platform of the projector and which is fitted with bothway motorized drive means situated above said fixed horizontal plate and extending over said platform; and a motor-driven switching plate whose rear edge is fixed on a transverse hinge shaft situated slightly in front of the leading edge of the top cassette, which switching plate normally occupies a first position where its leading edge is situated slightly above said fixed horizontal plate so that a sheet coming from said fixed horizontal plate passes beneath the switching plate and goes towards the bottom cassette, and is capable of occupying a second position where its leading edge penetrates into openings in said fixed horizontal plate such that a sheet coming from said fixed horizontal plate moves onto said switching plate and goes towards the top cassette.

2. A device according to claim 1, in which said cassettes are removable and are engaged on slideways fixed to two side plates of a frame of the device.

3. A device according to claim 1, in which the bottom of each cassette includes openings situated in the vicinity of its leading edge, and in which each cassette is fitted with levers situated beneath said openings and mounted on a transverse shaft which is actuated by an electromagnet.

4. A device according to claim 1, including two transverse shafts overlying the leading ends of respective ones of the cassettes, which shafts carry deflector pulleys having endless belts passing thereover for driving said sheets, with one of the two shafts being rotatable in both directions by an electric motor.

5. A device according to claim 4, in which the leading edge of each cassette is extended forwards by a plate extending parallel to the bottom of the cassette, which plate includes openings having presser wheels passing therethrough, which presser wheels are carried by a third transverse shaft.

6. A device according to claim 2, in which at least one of the two side plates is extended forwards by an arm which passes over said platform and which carries a pulley at its far end, an endless belt passing round said pulley so that the bottom length thereof extends over said horizontal plate and over said platform.

7. A device according to claim 1, including sensors for sensing the presence of a sheet, said sensors being disposed over the leading end of each cassette.

8. A device according to claim 7, further including a sensor for sensing the presence of a sheet and situated above said fixed horizontal plate.

9. A device according to claim 1, in which said fixed horizontal plate is mounted on a frame supported by two transverse rods, which rods are supported by two crossed links constituting a scissor linkage which links are hinged on two nuts screwed onto respective oppositely-handed threads on a single threaded rod, said rod including a slot enabling it to be rotated by a screwdriver so as to bring said fixed horizontal plate to the level of said projector platform.

10. A device according to claim 1, in which each cassette is square in shape with the side of the square being slightly longer than the longer side of the document sheets, and with the bottom of each cassette including a square raised portion in one of its corners situated along its trailing edge, with the side of the square raised portion being equal to the difference between the longer side and the shorter side of the document sheets, thereby enabling the document sheets to be placed lengthwise or crosswise in a single stack.

* * * * *